(12) United States Patent
Murao et al.

(10) Patent No.: US 8,189,779 B2
(45) Date of Patent: May 29, 2012

(54) QUANTUM PROGRAM CONCEALING DEVICE AND QUANTUM PROGRAM CONCEALING METHOD

(75) Inventors: Mio Murao, Tokyo (JP); Yu Tanaka, Hadano (JP)

(73) Assignee: Japan Science and Technology Agency, Saitama (JP)

( * ) Notice: Subject to any disclaimer, the term of this patent is extended or adjusted under 35 U.S.C. 154(b) by 381 days.

(21) Appl. No.: 12/527,408
(22) PCT Filed: Dec. 25, 2007
(86) PCT No.: PCT/JP2007/074830
§ 371 (c)(1), (2), (4) Date: Aug. 14, 2009
(87) PCT Pub. No.: WO2008/142816
PCT Pub. Date: Nov. 27, 2008

(65) Prior Publication Data
US 2010/0070780 A1 Mar. 18, 2010

(30) Foreign Application Priority Data
May 23, 2007 (JP) ................ P2007-136984

(51) Int. Cl.
*H04L 9/06* (2006.01)
(52) U.S. Cl. .......... 380/44; 380/277; 380/263; 713/189; 713/190
(58) Field of Classification Search .......... 713/189, 713/190; 380/44, 277
See application file for complete search history.

(56) References Cited

U.S. PATENT DOCUMENTS

| | | | | |
|---|---|---|---|---|
| 2005/0141716 | A1* | 6/2005 | Kumar et al. | 380/255 |
| 2008/0288771 | A1* | 11/2008 | Kulakowski et al. | 713/150 |

FOREIGN PATENT DOCUMENTS

| | | |
|---|---|---|
| JP | 2004349833 | 12/2004 |
| JP | 2006003948 | 1/2006 |
| JP | 2006331249 | 12/2006 |
| JP | 2007116216 | 5/2007 |

OTHER PUBLICATIONS

Computational Indistinguishability Between Quantum—May 8, 2006.*
Authorized Quantum Computation—Mar. 12, 2009.*
Quantum Concealment Computation—Aug. 31, 2002.*
PCT Written Opinion for International Application No. PCT/JP2007/074830 dated Jan. 21, 2010.
Kawachi, et al., "Computational Indistinguishabiity Betwwn Quantum States and Its Cryptographic Application", EUROCRYPT 2005, LNCS 3494, pp. 268-284.
International Search Report for International Application No. PCT/JP2007/074830, dated Mar. 21, 2008.

* cited by examiner

*Primary Examiner* — Jung Kim
*Assistant Examiner* — Tri Tran
(74) *Attorney, Agent, or Firm* — Patterson & Sheridan, LLP

(57) ABSTRACT

An object of the present invention is to enable an authorized user to execute a quantum program, without letting the authorized user know the operation contents of the quantum program.

A quantum program concealment device 10 includes an expansion unit 12 that generates an expanded quantum program that includes an inputted quantum program and has a quantum secret key quantum bit space corresponding to a quantum secret key in addition to an input quantum bit space of the quantum program, a control operation addition unit 13 that rewrites the expanded quantum program so as to perform a control operation that executes a quantum program in a case where the quantum secret key quantum bit space is in a predetermined state, an encryption unit 15 that adds, to the expanded quantum program, a first quantum gate array and a second quantum gate array for performing operations with respect to a state of the quantum secret key quantum bit space, a secret key generation unit 16 that generates a quantum secret key by performing an inverse operation of the first quantum gate array, and an obfuscation unit 17 that performs obfuscation with respect to the expanded quantum program to which the first quantum gate array has been added.

4 Claims, 3 Drawing Sheets

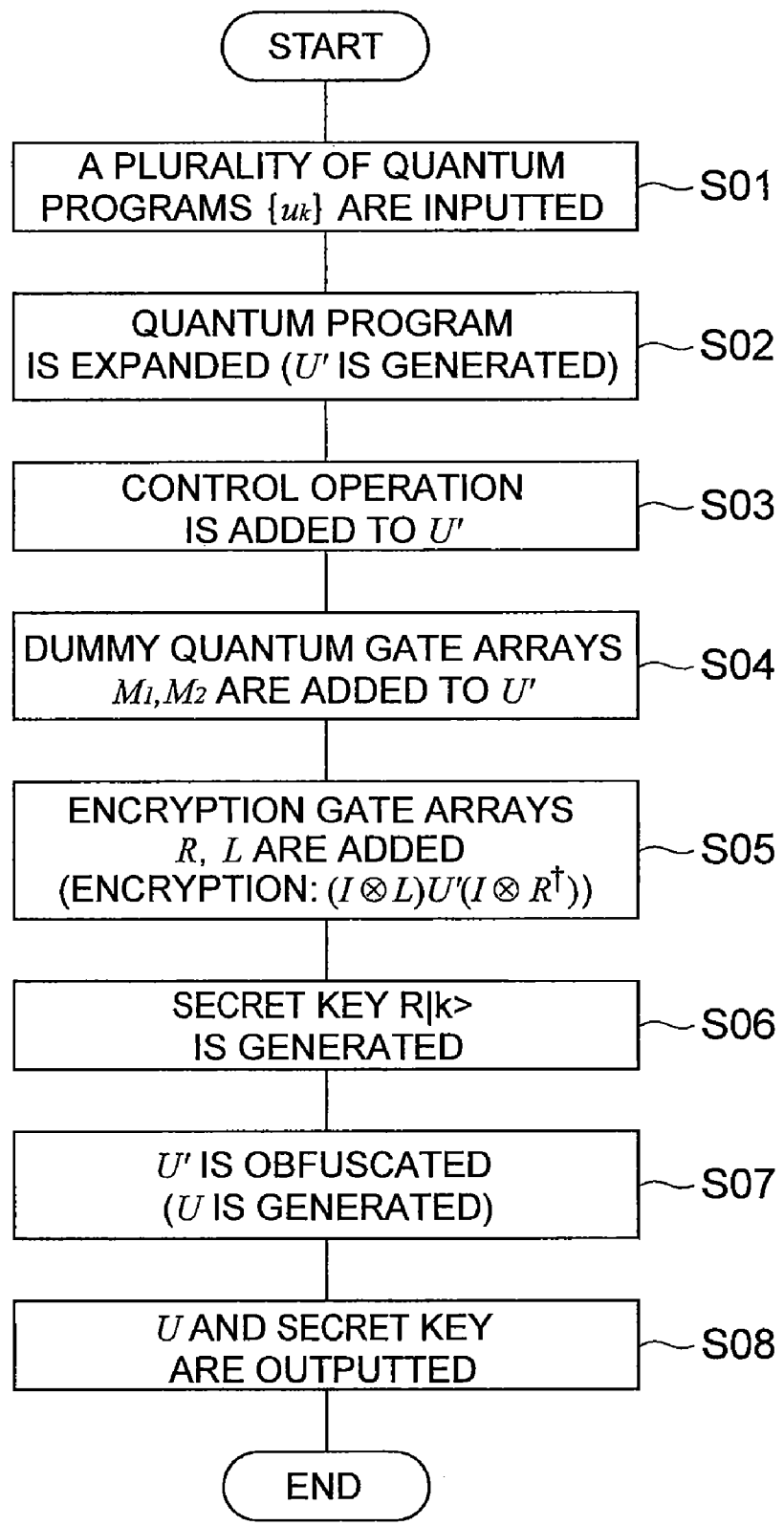

QUANTUM PROGRAM CONCEALING DEVICE AND QUANTUM PROGRAM CONCEALING METHOD

TECHNICAL FIELD

The present invention relates to a quantum program concealment device that conceals a quantum program including a quantum gate array indicating a unitary transformation and to a quantum program concealment method using the quantum program concealment device.

BACKGROUND ART

In public key encryption that is presently widely used for safely transmitting information via public communication lines, safety is secured by a computation amount of classic computers. Furthermore, in quantum encryption (quantum key allocation) that has heretofore been suggested, such as BB84, unconditional safety is secured, provided that authentication is correctly performed. However, with the above-described methods, safety is not secured in a case where a quantum computer is used. A research such as described in Non-patent Document 1 below relates to a public key protocol that uses a quantum system. Non-patent Document 1: A. Kawachi et al, Proc. EUROCRYPT 2005, LNCS 3494, 268, 2005.

DISCLOSURE OF THE INVENTION

Problems to Be Solved by the Invention

A mode can be considered in which a quantum program including quantum gates indicating a unitary transformation is made public upon specification (authentication) of a creator, and a person that is authorized to execute the quantum program is enabled to execute the program. However, with the technology described in Non-patent Document 1, because the quantum state is used as a public key, the quantum program is difficult to authenticate and use as a public protocol. Furthermore, in the above-described mode, a case is considered in which the quantum program has to be made public without letting the person executing the program know the operation contents of the quantum program, that is, the quantum program has to be concealed, but no technology for realizing such a mode has been suggested.

The present invention has been created to resolve the above-described problems and it is an object of the present invention to provide a quantum program concealment device and a quantum program concealment method that can enable an authorized user to execute a quantum program, without letting the authorized user know the operation contents of the quantum program.

Means for Solving the Problems

In order to attain the above-described object, the present invention provides a quantum program concealment device including: input means for inputting a quantum program that includes a quantum gate array indicating a unitary transformation; expansion means for generating an expanded quantum program that includes the quantum program inputted by the input means and has a quantum secret key quantum bit space that is a quantum bit space corresponding to a quantum secret key in addition to an input quantum bit space of the quantum program; control operation addition means for rewriting the expanded quantum program, which has been generated by the expansion means, so as to perform a control operation that executes a quantum program contained in the expanded quantum program in a case where the quantum secret key quantum bit space is in a predetermined state; encryption means for adding, to the expanded quantum program that is rewritten by the control operation addition means, a first quantum gate array for performing operations with respect to a state of the quantum secret key quantum bit space before the control operation is performed and a second quantum gate array for performing operations with respect to a state of the quantum secret key quantum bit space after the control operation has been performed; secret key generation means for generating a quantum secret key by performing an inverse operation of the first quantum gate array added by the encryption means, with respect to the predetermined state of the quantum secret key quantum bit space; obfuscation means for performing, on the basis of a rule that has been stored in advance, at least one of shuffling of quantum gate arrays and addition of a quantum gate array on the expanded quantum program to which the first quantum gate array has been added by the encryption means; and output means for outputting the expanded quantum program subjected to processing by the obfuscation means and the quantum secret key generated by the secret key generation means.

In the quantum program concealment device in accordance with the present invention, the expanded quantum program is generated from a quantum program. With the generated expanded quantum program, the quantum program is not executed by the control operations and the first quantum gate array, unless the quantum secret key is inputted in the quantum secret key quantum bit space. Thus, the quantum program is not executed unless a person has the quantum secret key. Furthermore, because the obfuscation is performed by at least one of the shuffling of gate arrays and the addition of a gate array on the expanded quantum program, the person executing the expanded quantum program does not know the operation contents thereof. Due to the presence of the second gate array, the quantum secret key outputted by the operation performed by the obfuscated expanded quantum program does not assume the predetermined state corresponding to the control operation to perform highly safe concealment. As a result, with the quantum program concealment device in accordance with the present invention, an authorized user can be enabled to execute a quantum program, without letting the authorized user know the operation contents of the quantum program.

It is preferred that the quantum secret key quantum bit space include a dummy space that does not relate to a control operation relating to rewriting of the expanded quantum program performed by the control operation addition means, and that the quantum program concealment device be further provided with dummy operation addition means for adding, to the expanded quantum program generated by the expansion means, a dummy quantum gate array for performing operations with respect to a state of the dummy space. With such a configuration, it is difficult to understand which bit in the quantum secret key quantum bit space relates to the quantum secret key. Therefore, concealment with even higher safety can be performed.

It is desirable that the input means input a plurality of the quantum programs and that the control operation addition means rewrite the expanded quantum program generated by the expansion means so as to perform a control operation that executes any of the quantum programs contained in the expanded quantum program according to a state of the quantum secret key quantum bit space. With such a configuration, the plurality of quantum programs can be executed with one expanded quantum program that has been processed by the quantum program concealment device in accordance with the present invention. Therefore, convenience for the user can be increased.

The present invention can be described, as demonstrated above, as an invention relating to a quantum program concealment device, but the present invention can be also described, as shown hereinbelow, as an invention relating to a quantum program concealment method. These are substantially identical inventions that differ only in a category thereof, and the operation and effect of the inventions are the same.

Thus, the quantum program concealment method in accordance with the present invention is a quantum program concealment method using a quantum program concealment device, including: an input step of inputting a quantum program that includes a quantum gate array indicating a unitary transformation; an expansion step of generating an expanded quantum program that includes the quantum program inputted in the input step and has a quantum secret key quantum bit space that is a quantum bit space corresponding to a quantum secret key in addition to an input quantum bit space of the quantum program; a control operation addition step of rewriting the expanded quantum program, which has been generated in the expansion step, so as to perform a control operation that executes a quantum program contained in the expanded quantum program in a case where the quantum secret key quantum bit space is in a predetermined state; an encryption step of adding, to the expanded quantum program that is rewritten in the control operation addition step, a first quantum gate array for performing operations with respect to a state of the quantum secret key quantum bit space before the control operation is performed and a second quantum gate array for performing operations with respect to a state of the quantum secret key quantum bit space after the control operation has been performed; a secret key generation step of generating a quantum secret key by performing an inverse operation of the first quantum gate array added in the encryption step, with respect to the predetermined state of the quantum secret key quantum bit space; an obfuscation step of performing, on the basis of a rule that has been stored in advance, at least one of shuffling of quantum gate arrays and addition of a quantum gate array on the expanded quantum program to which the first quantum gate array has been added in the encryption step; and an output step of outputting the expanded quantum program subjected to processing in the obfuscation step and the quantum secret key generated in the secret key generation step.

Effect of the Invention

With the expanded quantum program generated in accordance with the present invention, quantum programs cannot be executed unless the quantum secret key is inputted in the quantum secret key quantum bit space by the control operations and the first encryption gate array. Thus, unless the person has the quantum secret key, the quantum program will not be executed. Furthermore, because the obfuscation is performed by at least one of the shuffling of gate arrays and the addition of a gate array on the expanded quantum program, the person executing the expanded quantum program does not know the operation contents thereof. Due to the presence of the second gate array, the quantum secret key outputted by the operation performed by the obfuscated expanded quantum program does not assume the predetermined state corresponding to the control operation to perform a highly safe concealment. As a result, in accordance with the present invention, an authorized user can be enabled to execute a quantum program, without letting the authorized user know the operation contents of the quantum program.

BRIEF DESCRIPTION OF THE DRAWINGS

FIG. 3 is a flowchart illustrating a processing (quantum program concealment method) executed by the quantum program concealment device of an embodiment of the present invention.

EXPLANATION OF REFERENCE NUMERALS

Figure 1:
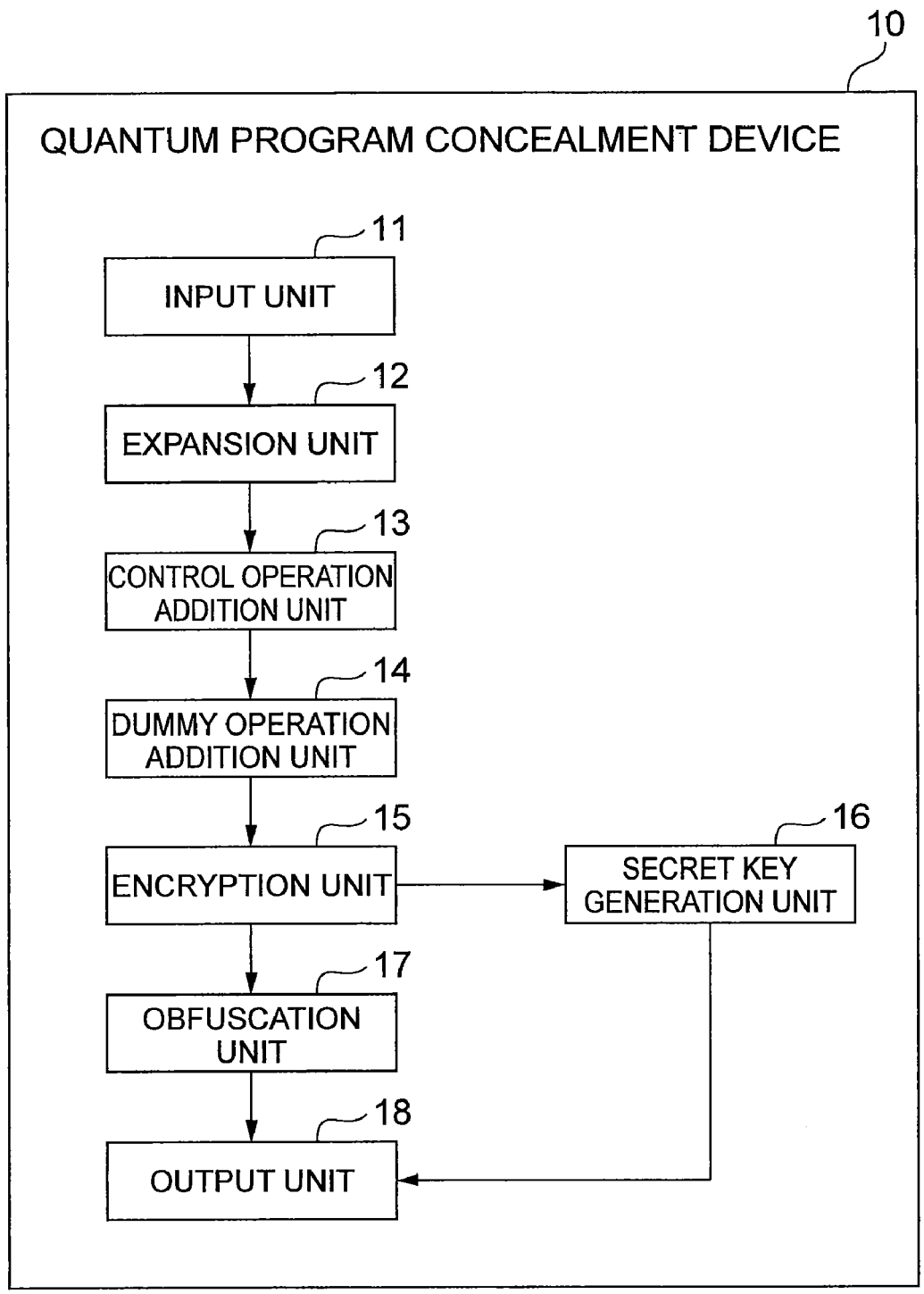
FIG. 1 illustrates a configuration of the quantum program concealment device of an embodiment of the present invention.

10 ... quantum program concealment device, 11 ... input unit, 12 ... expansion unit, 13 ... control operation addition unit, 14 ... dummy operation addition unit, 15 ... encryption unit, 16 ... secret key generation unit, 17 ... obfuscation unit, 18 ... output unit.

BEST MODE FOR CARRYING OUT THE INVENTION

The preferred embodiments of the quantum program concealment device and quantum program concealment method in accordance with the present invention will be explained hereinbelow in greater details with reference to the appended drawings. In the explanation of the drawings, identical elements are assigned with identical reference numerals and redundant explanation thereof is omitted.

Figure 2:
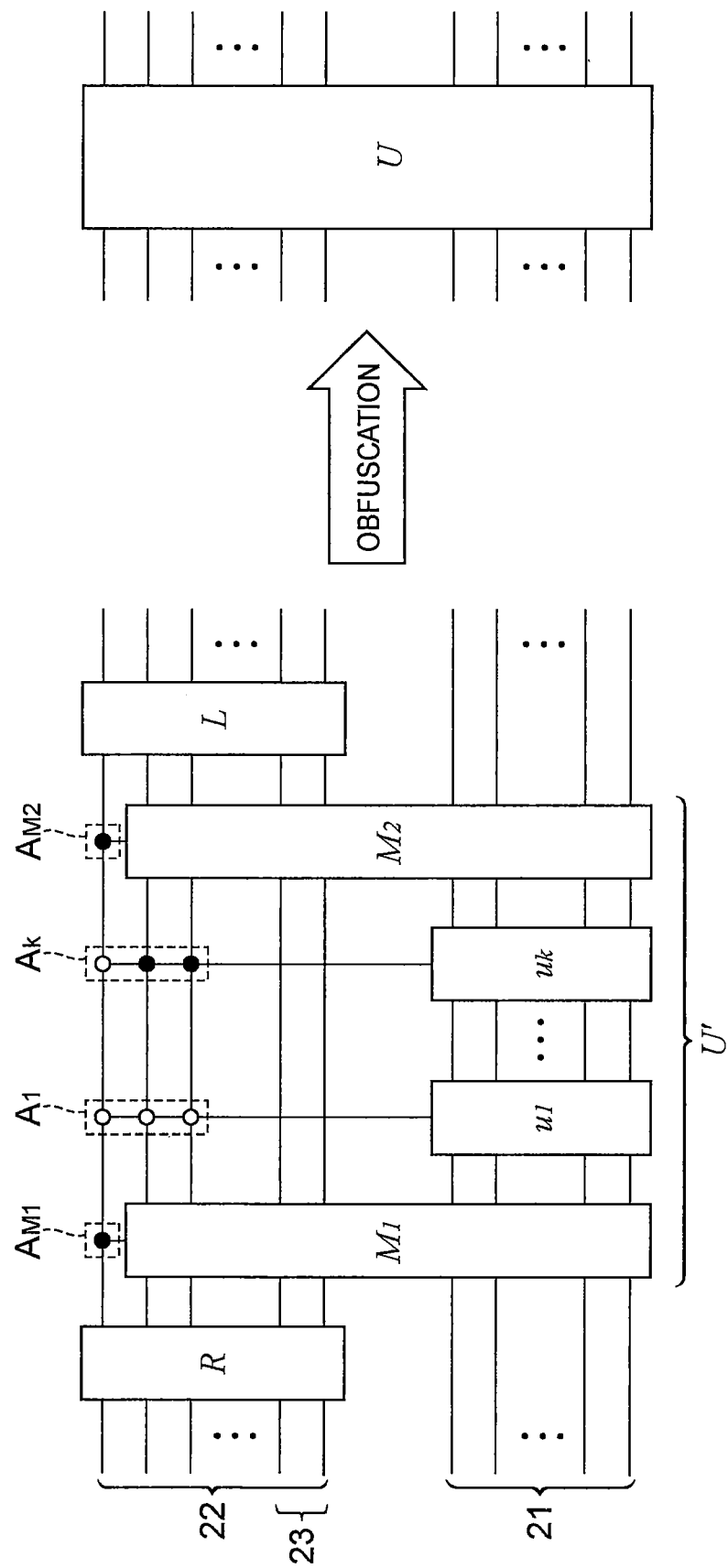
FIG. 2 illustrates schematically a quantum program that is concealed by the quantum program concealment device and an expanded quantum program that is generated thereby.

FIG. 1 shows a functional configuration of a quantum program concealment device 10 according to the present embodiment. The quantum program concealment device 10 is a device that conceals a quantum program that includes a quantum gate array indicating a unitary transformation. This concealment is performed to enable an authorized user to execute a quantum program, without letting the authorized user know the operation contents of the quantum program. FIG. 2 shows quantum programs $u_1$ to $u_k$ (k is the quantum program index) that will be processed in the present embodiment. In FIG. 2, the transverse lines represent quantum bits and rectangles represent a quantum gate array. The quantum program shown in FIG. 2 is usually executed from left to right. In the present embodiment, the processing object of the quantum program concealment device 10 is a plurality of quantum programs $u_1$ to $u_k$. However, one quantum program also may be the object of processing.

Each quantum program $u_1$ to $u_k$ is executed by an information processing device such as a quantum computer. More specifically, the quantum program can be executed by a quantum computer using an ion trap or NMR (Nuclear Magnetic Resonance). As shown in FIG. 2, each quantum programs $u_1$ to $u_k$ has an input quantum bit space 21 composed of one or more quantum bits, operation processing is performed by the quantum gate array with respect to the input of quantum information into the input quantum bit space, and quantum information subjected to the operation processing is outputted.

The functional configuration of the quantum program concealment device 10 will be described below in greater detail.

As shown in FIG. 1, the quantum program concealment device 10 is provided with an input unit 11, an expansion unit 12, a control operation addition unit 13, a dummy operation addition unit 14, an encryption unit 15, a secret key generation unit 16, an obfuscation unit 17, and an output unit 18.

The input unit 11 is an input means for inputting a plurality of quantum programs $\{u_k\}$. The input of quantum programs $\{u_k\}$ is carried out, for example, by receiving quantum programs $\{u_k\}$ sent from an external device connected to the quantum program concealment device 10. Furthermore, the quantum programs $\{u_k\}$ stored in the quantum program concealment device 10 may be also inputted by reading a user's operation or the like as a trigger. The input unit 11 outputs the inputted quantum programs $\{u_k\}$ to the expansion unit 12.

The expansion unit 12, as shown in FIG. 2 is an expansion means for generating an expanded quantum program U' including the quantum programs $\{u_k\}$ inputted by the input unit 11. The expanded quantum program U' has a quantum secret key quantum bit space 22 composed of one or more quantum bits, which is a quantum bit space corresponding to a quantum secret key, in addition to the input quantum bit space 21 of the quantum programs $\{u_k\}$. Thus, the expansion unit 12 generates the expanded quantum program $\{u_k\}$ in which the quantum bit space (degree of freedom) of the quantum programs $\{u_k\}$ is increased by the quantum secret key quantum bit space 22. More specifically, the quantum bit space is increased by setting as described hereinabove the definition of the quantum bit space of the expanded quantum program U'. The quantum secret key is quantum information having a state of a quantum bit of the quantum secret key quantum bit space 22 and serves to execute the quantum programs $\{u_k\}$. The quantum secret key will be described hereinbelow in greater detail. As will be described below, the quantum secret key quantum bit space 22 includes a dummy space 23 that has no relation to the possibility of executing the quantum programs $\{u_k\}$.

The control operation addition unit 13 is a control operation addition means for rewriting the generated the expanded quantum program U' so as to perform a control operation of executing the quantum programs $\{u_k\}$ contained in the expanded quantum program U' in a case where the quantum secret key quantum bit space 22 is in a predetermined state. The predetermined state is uniquely established so as to be different for each quantum program $\{u_k\}$, for example, a state $A_1$ for the quantum program $u_1$ and $A_k$ for quantum program $u_k$, as shown in FIG. 2. Thus, the aforementioned control operation is an operation that performs control so that the quantum program $u_1$ is executed in a case where the quantum secret key quantum bit space 22 is in the state $A_1$ and quantum program $u_k$ is executed in a case where the quantum secret key quantum bit space 22 is in the state $A_k$. The dummy space 23 has no relation to the possibility of executing the quantum programs $\{u_k\}$.

The predetermined state may be uniquely established in advance and stored in a memory or the like, and also may be uniquely established at a processing time according to a program or the like. The control operation addition unit 13 outputs the rewritten expanded quantum program U' to the dummy operation addition unit 14.

The dummy operation addition unit 14 is a dummy operation addition means for adding dummy quantum gate arrays $M_1, M_2$ that perform operations with respect to the state of the dummy state 23 to the expanded quantum program U'. Therefore, the dummy quantum gate arrays $M_1, M_2$ produce no effect on the input quantum bit space 21 and quantum secret key quantum bit space 22 other than the dummy space 23 in the quantum bit space of the expanded quantum program U'.

The dummy quantum gate arrays $M_1, M_2$ are at random selected to satisfy the above-described condition.

The dummy quantum gate arrays $M_1, M_2$ that are to be added are provided before and after the quantum programs $\{u_k\}$ in the expanded quantum program U', as shown in FIG. 2. The dummy quantum gate arrays may be also provided only before or after. Furthermore, each dummy quantum gate array $M_1, M_2$ may be executed according to states $A_{M1}, A_{M2}$ of any quantum bits in the quantum bit space of the expanded quantum program U' by control operations. The dummy operation addition unit 14 outputs the expanded quantum program U' having the dummy quantum gate arrays $M_1, M_2$ added thereto to the encryption unit 15.

The encryption unit 15 is an encryption means for adding to the expanded quantum program U' an encryption gate array R that is a first quantum gate array for performing operations with respect to the state of the quantum secret key quantum bit space 22 before the control operations that execute the quantum programs $\{u_k\}$ are performed. The encryption gate array R is selected at random. The encryption gate array R serves for concealing the state of the quantum secret key quantum bit space 22 corresponding to the quantum programs $\{u_k\}$. Thus, the encryption gate array R serves to prevent the direct input of quantum information that indicates the state of the quantum secret key quantum bit space 22 corresponding to the quantum programs $\{u_k\}$ when the quantum programs $\{u_k\}$ are executed.

The encryption unit 15 adds to the expanded quantum program U' an encryption gate array L that is a second quantum gate array for performing operations with respect to the state of the quantum secret key quantum bit space 22 after the control operations that execute the quantum programs $\{u_k\}$ have been performed. The encryption gate array L is selected at random. The encryption gate array L serves to conceal the state of the quantum secret key quantum bit space 22 corresponding to the quantum programs $\{u_k\}$. Thus, the encryption gate array L prevents the direct output of quantum information indicating the state of the quantum secret key quantum bit space 22 corresponding to the quantum programs $\{u_k\}$ when the quantum programs $\{u_k\}$ are executed. The addition of encryption gate arrays R, L to the expanded quantum program U' is called encryption. The expanded quantum program U' encrypted by the encryption unit 15 is shown by the following formula.

$$(I \otimes L) U'(I \otimes R^\dagger) \qquad \text{[Formula 1]}$$

The encryption unit 15 outputs the encrypted expanded quantum program U' to the obfuscation unit 17. The encryption unit 15 also outputs the encryption gate array R to the secret key generation unit 16.

The secret key generation unit 16 is a secret key generation means for generating a quantum secret key R|k> by performing an inverse operation (operations from right to left in FIG. 2) of the encryption gate array R with respect to the predetermined state corresponding to the quantum programs $\{u_k\}$ in the above-described control operations of the quantum secret key quantum bit space 22. The quantum secret key R|k> is generated as quantum information indicating the state of the quantum secret key quantum bit space 22. The generation of the quantum secret key R|k> is performed for each quantum program $\{u_k\}$, and the number of generation quantum secret keys is equal to the number of quantum program $\{u_k\}$. The secret key generation unit 16 outputs the generated quantum secret key to the output unit 18.

Where the quantum secret key R|k> is inputted to the quantum secret key quantum bit space 22 of the encrypted expanded quantum program U' that has been generated in the above-described manner, the quantum program $u_k$ corresponding to the quantum secret key R|k> (designated by the quantum secret key R|k>) is executed with respect to arbitrary quantum information|input> inputted in the input quantum bit space 21. This execution of the program is represented by the formula below. In this formula, $u_k$|input> shows a quantum computation to execute.

$$(I \otimes L)U'(I \otimes R^\dagger)|\text{input} \otimes \otimes R|k\rangle = u_k|\text{input}\rangle)L|k\rangle \qquad \text{[Formula 2]}$$

The obfuscation unit 17 is an obfuscation means for performing obfuscation with respect to the expanded quantum program U' to which the encryption gate arrays R, L have been added by the encryption unit 15. The obfuscation unit 17 generates a quantum program U by performing obfuscation as shown in FIG. 2. The representation of the quantum gate array in the quantum program is changed by the obfuscation to make it difficult to understand which operation is performed by the quantum program (what gate arrays in what order are lined up in the quantum program). Therefore, the obfuscation does not change the operations performed by the quantum program.

More specifically, the obfuscation of the program is the shuffling of the quantum gate array and the addition of a quantum gate array. It is not necessary to perform both the shuffling of the quantum gate array and the addition of a quantum gate array, and at least either of the two operations may be performed. The aforementioned obfuscation is performed by the obfuscation unit 17 on the basis of the rule that has been stored in advance. The shuffling of the quantum gate array is performed, for example, so as to store the commutation relation of quantum mechanics of the quantum gate array in advance in the obfuscation unit 17 as the aforementioned rule and so that the operations performed by the expanded quantum program U' do not change, on the basis of the commutation relation. Furthermore, the addition of a quantum gate array is performed by storing in advance in the obfuscation unit 17 a quantum gate array of an identity operator for which the operation performed by the expanded quantum program U' does not change and adding this quantum gate array. The obfuscation unit 17 outputs the quantum program U subjected to obfuscation in the output unit 18.

The output unit 18 is an output means for outputting the expanded quantum program U that has been subjected to obfuscation in the obfuscation unit 17 and the quantum secret key generated by the secret key generation unit 16. The output may be performed with respect to another device connected to the quantum program concealment device 10, or may be performed to a memory or the like contained in the quantum program concealment device 10 so that the expanded quantum program U subjected to obfuscation and the quantum secret key can be freely used.

The quantum program concealment device 10 is, for example, an information processing device such as a quantum computer that is similar to a device where a quantum program is executed. More specifically, for example, the quantum program concealment device is a quantum computer using an ion trap or NMR. The above-described functions are realized when hardware of the device is operated by the program or the like. The described above is the configuration of the quantum program concealment device 10.

The processing (quantum program concealment method) executed in the quantum program concealment device 10 of the present embodiment will be described below using the flowchart shown in FIG. 3. This processing is performed when the quantum programs $\{u_k\}$ are concealed, e.g. by the creator of the quantum programs $\{u_k\}$.

First, the quantum programs $\{u_k\}$ are inputted by the input device 11 into the quantum program concealment device 10 (S01, input step). Then, the expansion unit 12 generates the expanded quantum program U' having the quantum secret key quantum bit space 22 corresponding to the quantum secret key in addition to the input quantum bit space 21 of the quantum programs $\{u_k\}$ that includes the inputted quantum programs $\{u_k\}$ (S02, expansion step). The expanded quantum program U' is then rewritten by the control operation addition unit 13 so that control operations by which the quantum programs $u_1$ to $u_k$ contained in the expanded quantum program U' are executed are performed in a case where the quantum secret key quantum bit space 22 is in a predetermined state $A_1$ to $A_k$ (S03, control operation addition step).

The dummy quantum gate arrays $M_1$, $M_2$ that perform operations with respect to the state of the dummy space 23 contained in the quantum secret key quantum bit space 22 are then added to the expanded quantum program U' by the dummy operation addition unit 14 (S04, dummy operation addition step). The encryption gate arrays R, L are then added to the expanded quantum program U' by the encryption unit 15 (S05, encryption step). The processing of S03 to S05 may be carried out in any sequence, provided that the expanded quantum program U' is obtained after the processing such as shown in FIG. 2 is completed. Therefore, the processing sequence is not necessarily the above-described sequence.

Then, the quantum secret key R|k> is generated by performing an inverse operation of the encryption gate array R with respect to the predetermined state $A_1$ to $A_k$ of the quantum secret key quantum bit space 22 by the secret key generation unit 16 (S06, secret key generation step). Then, the obfuscation of the expanded quantum program U' is carried out, as shown in FIG. 2, by the obfuscation unit 17, and the obfuscated expanded quantum program U is generated (S07, obfuscation step). The processing of S06 and S07 is performed independently. Therefore, the processing order may be inverted. Then, the obfuscated expanded quantum program U and quantum secret key R|k> are outputted by the output unit 18 (S08, output step). The described above is the processing executed by the quantum program concealment device 10.

The obfuscated expanded quantum program U and quantum secret key R|k> generated by the quantum program concealment device 10 can be used, for example, in the manner as follows. The obfuscated expanded quantum program U can be made public as a classic public key upon a program creator authentication in an authentication station or the like. The expanded quantum program U can be acquired by any person. A person executing the quantum programs $\{u_k\}$ contained in the expanded quantum program U can acquire the quantum secret key R|k> corresponding to the quantum program $u_k$ that is wished to be executed by receiving a supply from the program creator. The person that that executes the program inputs the quantum secret key R|k> in the quantum secret key quantum bit space 22 of the expanded quantum program U, inputs arbitrary quantum information|input> in the input quantum bit space 21, and executes the obfuscated expanded quantum program U.

$$U(|\text{input}\rangle \otimes R|k\rangle) \qquad \text{[Formula 3]}$$

As a result, the quantum program $u_k$ is executed with respect to the arbitrary quantum information|input> as shown by the following formula.

$$u_k|\text{input}\rangle \otimes R|k\rangle \qquad \text{[Formula 4]}$$

In the obfuscated expanded quantum program U generated by the quantum program concealment device 10 according to the present embodiment in the above-described manner, quantum programs $\{u_k\}$ cannot be executed unless the quantum secret key R|k> is inputted in the quantum secret key quantum bit space 22 by the above-described control operations and encryption gate array R. Thus, unless the person has the quantum secret key R|k>, the quantum program $\{u_k\}$ will not be executed.

As a result of the above-described obfuscation, a person that executes the obfuscated expanded quantum program U cannot specify the quantum program $\{u_k\}$ (unitary operation) by a polynom time from the information on the obfuscated expanded quantum program U (classic public key) even by using a quantum computer. Furthermore, the specification of the quantum state of the quantum secret key R|k> is also impossible by quantum computations of a polynom time. It is only the creator of the obfuscated expanded quantum program U who can execute quantum computations in a polynom time, without using the quantum secret key, if the above-described processing (concealed quantum computations) is used. Therefore, with the present embodiment, an authorized person can be enabled to execute the quantum program $\{u_k\}$, without letting the authorized user know the operation contents thereof.

Because of the presence of the encryption quantum gate array L, the highly safe concealment can be performed so that the quantum secret key computed by the obfuscated expanded quantum program U and outputted does not assume a predetermined state $A_1$ to $A_k$ corresponding to the above-described control operations.

Thus, in the present embodiment, concealment quantum computations can be performed as a quantum encrypted element technology (encrypted primitive) on the basis of a QMA (Quantum Merlin-Arthur) hard problem for which the safety is secured operationally even with a quantum computer. The concept of concealment quantum computation is discovered by the inventors of the present application and described below. The concealment quantum computation is a quantum protocol between two persons A and B. The person A (that is, a creator of the quantum programs $\{u_k\}$ in the present embodiment) determines the quantum protocol (unitary transformation in quantum computations) and the person B prepares the input quantum information (that is a person that executes the quantum programs $\{u_k\}$).

The person A encrypts and obfuscates the quantum programs to obtain an classic public key and transmits it together with the quantum secret key that performs decoding to the person B. Because the quantum secret key is in an unknown quantum state, identification is impossible, and the quantum program cannot be deciphered computationally due to obfuscations that is a QMA hard. The person B can execute the quantum program with respect to a prepared arbitrary input quantum information, without the person A letting the person B know the quantum program contents. Described above is the concealment quantum computation.

Where the dummy quantum gate arrays $M_1$, $M_2$ are added to the expanded quantum program U', as in the present embodiment, it is difficult to understand which bit in the quantum secret key quantum bit space 22 relates to the quantum secret key. Therefore, concealment with even higher safety can be performed.

Where a plurality of quantum programs $\{u_k\}$ are inputted and introduced in the obfuscated expanded quantum program U, as in the present embodiment, the plurality of quantum programs $\{u_k\}$ can be executed with one obfuscated expanded quantum program U. Therefore, convenience for the user can be increased. However, it is not necessary to introduce the plurality of quantum programs in the obfuscated expanded quantum program U, and in a case where there is one quantum program that is used for concealment quantum computations, only this one quantum program may be introduced in the obfuscated expanded quantum program U.

The invention claimed is:

1. A quantum program concealment device comprising:
input means for inputting a quantum program that includes a quantum gate array indicating a unitary transformation;
expansion means for generating an expanded quantum program that includes the quantum program inputted by the input means and has a quantum secret key quantum bit space that is a quantum bit space corresponding to a quantum secret key in addition to an input quantum bit space of the quantum program;
control operation addition means for rewriting the expanded quantum program, which has been generated by the expansion means, so as to perform a control operation that executes a quantum program contained in the expanded quantum program in a case where the quantum secret key quantum bit space is in a predetermined state;
encryption means for adding, to the expanded quantum program that is rewritten by the control operation addition means, a first quantum gate array for performing operations with respect to a state of the quantum secret key quantum bit space before the control operation is performed and a second quantum gate array for performing operations with respect to a state of the quantum secret key quantum bit space after the control operation has been performed;
secret key generation means for generating a quantum secret key by performing an inverse operation of the first quantum gate array added by the encryption means, with respect to the predetermined state of the quantum secret key quantum bit space; obfuscation means for performing, on the basis of a rule that has been stored in advance, at least one of shuffling of quantum gate arrays and addition of a quantum gate array on the expanded quantum program to which the first quantum gate array has been added by the encryption means; and
output means for outputting the expanded quantum program subjected to processing by the obfuscation means and the quantum secret key generated by the secret key generation means.

2. The quantum program concealment device according to claim 1, wherein
the quantum secret key quantum bit space includes a dummy space that does not relate to a control operation relating to rewriting of the expanded quantum program performed by the control operation addition means, and
the quantum program concealment device further comprises dummy operation addition means for adding, to the expanded quantum program generated by the expansion means, a dummy quantum gate array for performing operations with respect to a state of the dummy space.

3. The quantum program concealment device according to claim 1, wherein
the input means inputs a plurality of the quantum programs, and
the control operation addition means rewrites the expanded quantum program generated by the expansion means so as to perform a control operation that executes any of the quantum programs contained in the expanded quantum program according to a state of the quantum secret key quantum bit space.

4. A quantum program concealment method using a quantum program concealment device, comprising:
- an input step of inputting a quantum program that includes a quantum gate array indicating a unitary transformation;
- an expansion step of generating an expanded quantum program that includes the quantum program inputted in the input step and has a quantum secret key quantum bit space that is a quantum bit space corresponding to a quantum secret key in addition to an input quantum bit space of the quantum program;
- a control operation addition step of rewriting the expanded quantum program, which has been generated in the expansion step, so as to perform a control operation that executes a quantum program contained in the expanded quantum program in a case where the quantum secret key quantum bit space is in a predetermined state;
- an encryption step of adding, to the expanded quantum program that is rewritten in the control operation addition step, a first quantum gate array for performing operations with respect to a state of the quantum secret key quantum bit space before the control operation is performed and a second quantum gate array for performing operations with respect to a state of the quantum secret key quantum bit space after the control operation has been performed;
- a secret key generation step of generating a quantum secret key by performing an inverse operation of the first quantum gate array added in the encryption step, with respect to the predetermined state of the quantum secret key quantum bit space; an obfuscation step of performing, on the basis of a rule that has been stored in advance, at least one of shuffling of quantum gate arrays and addition of a quantum gate array on the expanded quantum program to which the first quantum gate array has been added in the encryption step; and
- an output step of outputting the expanded quantum program subjected to processing in the obfuscation step and the quantum secret key generated in the secret key generation step.

\* \* \* \* \*